(12) United States Patent
Vulich

(10) Patent No.: US 10,063,657 B2
(45) Date of Patent: Aug. 28, 2018

(54) MANAGING IDENTICAL DATA REQUESTS

(71) Applicant: SAP Portals Israel Ltd., Ra'anana (IL)

(72) Inventor: Yan Vulich, Kiryat Ono (IL)

(73) Assignee: SAP Portals Israel Ltd, Ra'anana (IL)

( * ) Notice: Subject to any disclaimer, the term of this patent is extended or adjusted under 35 U.S.C. 154(b) by 269 days.

(21) Appl. No.: 14/881,405

(22) Filed: Oct. 13, 2015

(65) Prior Publication Data
US 2017/0104846 A1 Apr. 13, 2017

(51) Int. Cl.
*H04L 29/08* (2006.01)
*G06F 17/30* (2006.01)

(52) U.S. Cl.
CPC .......... *H04L 67/327* (2013.01); *H04L 67/02* (2013.01); *H04L 67/1027* (2013.01); *H04L 67/1095* (2013.01); *G06F 17/30067* (2013.01); *G06F 17/30905* (2013.01)

(58) Field of Classification Search
CPC ............ H04L 65/605; H04L 67/2842; H04L 67/2852; H04W 24/08
See application file for complete search history.

(56) References Cited

U.S. PATENT DOCUMENTS

| | | | |
|---|---|---|---|
| 6,711,606 B1* | 3/2004 | Leymann | G06F 17/30067 707/E17.01 |
| 6,920,489 B1* | 7/2005 | Yamamoto | H04L 67/1027 709/219 |
| 9,047,587 B2 | 6/2015 | Slakman et al. | |
| 2003/0083755 A1* | 5/2003 | Denoual | G06F 17/30905 700/2 |
| 2007/0004394 A1* | 1/2007 | Chu | H04W 24/08 455/422.1 |
| 2010/0185704 A1* | 7/2010 | George | G06F 12/0815 707/821 |
| 2013/0124683 A1* | 5/2013 | Watanabe | H04N 21/4622 709/217 |
| 2014/0161125 A1* | 6/2014 | Liu | H04L 67/1095 370/390 |
| 2015/0269498 A1* | 9/2015 | Bigourdan | G06Q 10/02 705/5 |

* cited by examiner

*Primary Examiner* — Barbara B Anyan
(74) *Attorney, Agent, or Firm* — Fish & Richardson P.C.

(57) ABSTRACT

The disclosure generally describes methods, software, and systems, including a method for managing co-pending, identical data requests. An initial request is received for a first data object. Processing of the initial request is initiated, including dispatching the initial request to a server. Prior to receiving a response to the dispatched initial request, a first identical request is received. The first identical request is held without dispatching. Prior to receiving the response to the dispatched initial request, a second identical request is received. The first identical request is disregarded and the second identical request is held without dispatching the second identical request to the server. The responsive data object is received in response to the initial request. The responsive data object is provided in response to the second identical request, the providing occurring without initiating processing, by the server, of the first identical request and the second identical request.

14 Claims, 3 Drawing Sheets

MANAGING IDENTICAL DATA REQUESTS

BACKGROUND

The present disclosure relates to managing co-pending data requests.

Web servers that receive requests and perform request handling may take some time to process each request, during which time new requests, identical to the request already in process, may arrive. New requests may cause, for example, data integrity problems, wasted central processor unit (CPU) time, a stuck requests pool, and/or confusion on a client side. In some cases, software developers can implement internal logic to stop new requests. For example, multithreading synchronization can be provided in a server that processes the requests. In another example, process states can be handled in a data base, e.g., by adding new columns in database tables to indicate co-pending requests.

SUMMARY

The disclosure generally describes computer-implemented methods, software, and systems for managing co-pending data requests. An initial request is received for a first data object. Processing of the initial request is initiated, including dispatching the initial request to a server corresponding to the first data object. Prior to receiving a response to the dispatched initial request corresponding to the first data object, a first identical request is received for the first data object. In response to determining that the first identical request is identical to the initial request and prior to receiving the response to the dispatched initial response, the first identical request is held without dispatching the first identical request to the server. Prior to receiving a response to the dispatched initial request corresponding to the first data object and after receiving the first identical request, a second identical request is received for the first data object. In response to determining that the second identical request is identical to the initial request and the first identical request, and prior to receiving the response to the dispatched initial response, the first identical request is disregarded and the second identical request is held without dispatching the second identical request to the server. The responsive data object is received in response to the initial request. In response to receiving the responsive data object in response to the initial request, the responsive data object is provided in response to the second identical request, the providing occurring without initiating processing, by the server, of the first identical request and the second identical request.

The present disclosure relates to computer-implemented methods, software, and systems for generating executable components. One computer-implemented method includes: receiving an initial request for a first data object; initiating processing of the initial request, including dispatching the initial request to a server corresponding to the first data object; receiving, prior to receiving a response to the dispatched initial request corresponding to the first data object, a first identical request for the first data object; in response to determining that the first identical request is identical to the initial request and prior to receiving the response to the dispatched initial response, holding the first identical request without dispatching the first identical request to the server; receiving, prior to receiving a response to the dispatched initial request corresponding to the first data object and after receiving the first identical request, a second identical request for the first data object; in response to determining that the second identical request is identical to the initial request and the first identical request and prior to receiving the response to the dispatched initial response, disregarding the first identical request and holding the second identical request without dispatching the second identical request to the server; receiving the responsive data object in response to the initial request; and in response to receiving the responsive data object in response to the initial request, providing the responsive data object in response to the second identical request, the providing occurring without initiating processing, by the server, of the first identical request and the second identical request.

The foregoing and other implementations can each optionally include one or more of the following features, alone or in combination. In particular, one implementation can include all the following features:

In a first aspect, combinable with any of the previous aspects, the server is, or includes, one or more of a server and an application.

In a second aspect, combinable with any of the previous aspects, the initial request and the first and second identical requests are from the same user.

In a third aspect, combinable with any of the previous aspects, the initial request is received from a first user and at least one of the first and second identical requests is received from a second different user, and providing the responsive data object in response to the second identical request further includes providing the responsive data object in response to a request from the other one of the first and second user.

In a fourth aspect, combinable with any of the previous aspects, the method further comprises disregarding the identical request and holding the identical request without dispatching the second identical request to the server.

In a fifth aspect, combinable with any of the previous aspects, the method further comprises sending a notification in response to determining that the new requests are identical.

In a sixth aspect, combinable with any of the previous aspects, the data object is a business object.

The subject matter described in this specification can be implemented in particular implementations so as to realize one or more of the following advantages. Managing co-pending requests, such as by disregarding subsequent requests for the same data, can decrease web traffic. Browsers that forget previously-sent requests can receive a response for the latest of plural co-pending requests. Additional threads for requesting the same data object need not be started by a server. By disregarding (and not processing) co-pending, identical requests, servers can be less likely to reach their maximum request limit. Identical requests are held without initiating processing, by a server, of the identical requests.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for managing co-pending, identical data requests. For example, optimization can be used by or for servers (e.g., web servers and/or applications) that receive identical requests, such as from the same source. Identical requests can be, for example, requests for the same data object that are received from the same user identifier, same device identifier, and/or other matching requesting source information. When a client sends multiple identical requests, for example, there may be no process that is waiting on a response for an old request. This may happen when browsers refresh and older requests are simply forgotten by the browser, even though full processing of the request has occurred at the server. In some implementations, the server dispatcher can identify identical requests and optimize processing of the requests. For example, the processing flow at an infrastructural level can prevent identical requests from being forwarded for processing, e.g., handled by developer code.

In some implementations, the following algorithm can be used. A method associated with the server flow for handling requests can be marked for optimization (e.g., by annotation or other ways). A first received request can start the server flow. Each time an identical request is received and identified by a dispatcher as being identical to the first request, the received identical request can be postponed during a wait for the first request to finish. If another identical request is received while the previous identical request is waiting, the previous identical request can be deleted or otherwise disregarded). Once the job started by the first request is done, the response can be attached to, linked with, or otherwise associated with the latest, or most recent, identical request and returned to the client. In this way, if N requests are received by the time Request 1 has been processed, requests 2 through N-1 will have already been deleted or otherwise disregarded, and a response is provided to Request N.

In some implementations, systems and methods described herein can be used for other types of identical requests, such as for various types of operations in addition to requests for data objects. For example, an initial request of a series or set of identical requests to store a data object can cause initiation, by the dispatcher, of an operation by an application or server to store the data object. When identical requests to store the same data object are subsequently received by the dispatcher, the identical requests can be held and/or discarded as needed. Once the data object is stored successfully, the dispatcher can send an acknowledgement of the stored data object in response to the final request.

Figure 1:
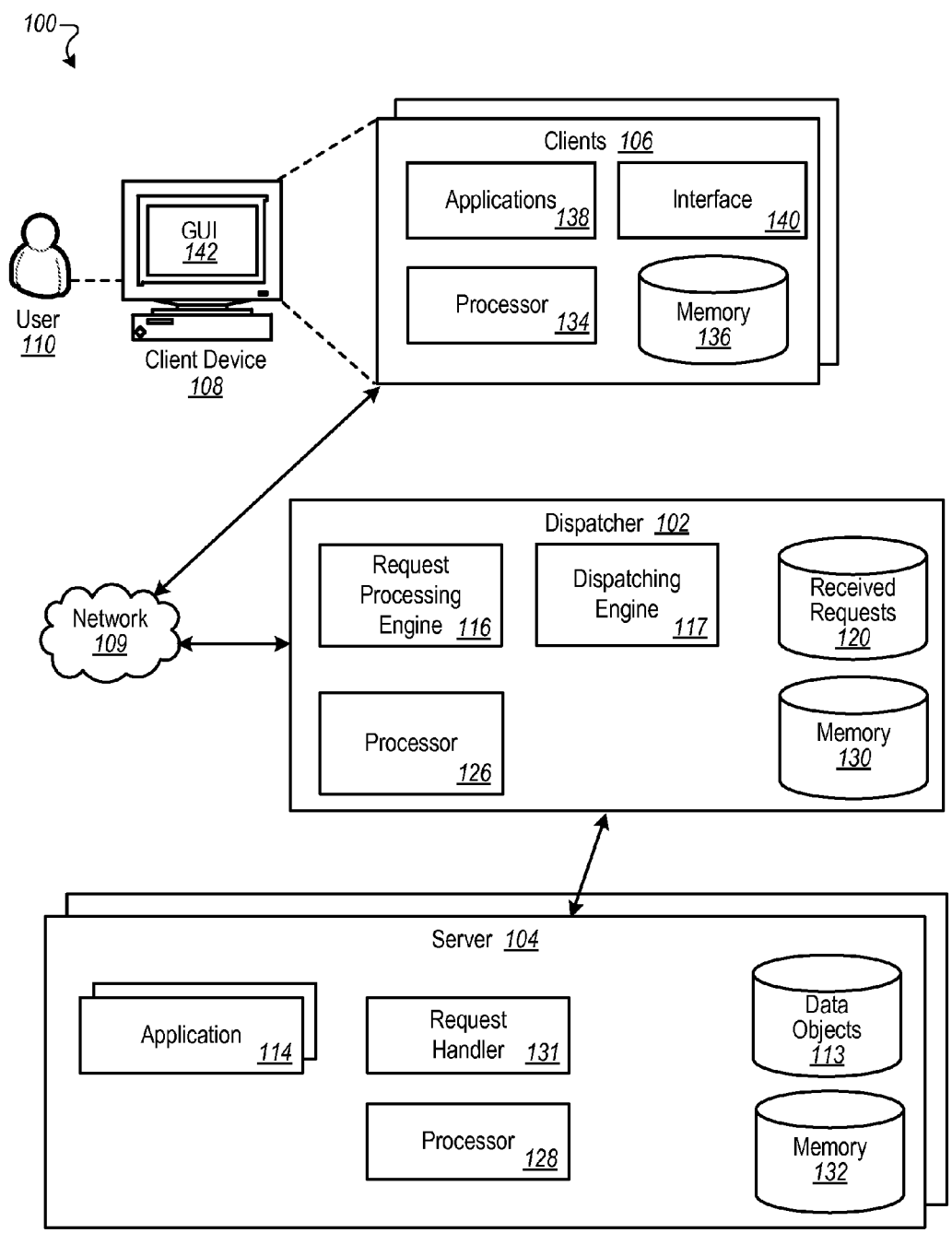
FIG. 1 is a block diagram of an example environment for managing co-pending, identical data requests.

FIG. 1 is a block diagram of an example environment 100 for managing co-pending, identical data requests. The illustrated environment 100 includes, or is communicably coupled with, at least one server 104, at least one dispatcher 102, and plural clients 106, all connected using a network 109. The environment 100 can be used, for example, to handle identical requests received from one or more of the clients 106. For example, the dispatcher 102 can intercept the requests and dispatch requests to the server 104 that are necessary and sufficient for processing. Each client 106 comprises an electronic computing device operable to provide information to a user, e.g., using data (e.g., data objects 113) from the server 104 and other sources for display on web pages and/or for other uses.

At a high level, the dispatcher 102 comprises an electronic computing device operable to receive requests for data objects and dispatch the requests, as needed, to the server 104. For example, the dispatcher 102 can include a request processing engine 116 that can process requests received from the client 106. The request processing engine 116, for example, can determine if a received request is an identical request. When an identical request is identified, for example, the request processing engine 116 can hold the identical request (e.g., for associating with a subsequent response from the server 104) and disregard a previous identical request, if any. If a request is an initial request (e.g., not an identical of a previously received and currently pending request), then a dispatching engine 117 can dispatch the request to the server 104. The dispatching engine 117 can also associate a response to the request with a request (e.g., the Nth request of N requests) after the response is received from the server. The request processing engine 116 can provide the response obtained from the server 104 to the requesting client 106.

A data store of received requests 120 can include, for example, data object requests for which processing has been requested of the server 104, requests that have been marked as disregarded (e.g., requests 2 through N-1 of N identical requests), and the last (e.g., Nth) request in any set of identical requests. In some implementations, different types of requests (initial, disregarded, and most recent) can be stored separately. In some implementations, the initial request and the most recently received identical request can be deleted from the received requests 120 when a response to the request has been processed by the server 104 and provided to the client 106.

At a high level, the server 104 comprises an electronic computing device operable to store and provide access to data objects for use by the plural clients 106. An application 114, for example, can be used by the server 104 to access one or more specific data objects 113. For example, there can be plural applications 114, each associated with a different data object 113. Each application 114 can be capable of handling different types of requests for the same data object 113. Some applications 114 can be capable of handling requests for a group or combination of data objects 113, e.g., to construct a logical data object. In some implementations, the data store of data objects 113 can be stored or distributed in plural locations, e.g., at the server 104 and/or other locations.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. Indeed, the server 104, the dispatcher 102, and the clients 106 may be any computer or processing device. In some implementations, the dispatcher 102 can be part of the server 104. In some implementations, components of the dispatcher 102 and the server 104 may be distributed in different locations and coupled using the network 109.

The dispatcher 102 includes a processor 126 and memory 130. Although illustrated as the single processor 126 in FIG. 1, two or more processors 126 may be used according to particular needs, desires, or particular implementations of the environment 100. Generally, the processor 126 executes instructions and manipulates data to perform the operations of the dispatcher 102. Specifically, the processor 126 executes the functionality required to receive and process requests from the dispatcher 102. In some implementations, the memory 130 includes the data store of received requests 120.

The server 104 includes a processor 128 and memory 132. Although illustrated as the single processor 128 in FIG. 1, two or more processors 128 may be used according to particular needs, desires, or particular implementations of the environment 100. Generally, the processor 128 executes instructions and manipulates data to perform the operations of the server 104. Specifically, the processor 128 executes the functionality required to receive and process requests from the server 104. In some implementations, the memory 132 can store the data store of data objects 113.

The memory 132 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104.

Each client 106 (and each dispatcher 102) of the environment 100 may be any computing device operable to connect to, or communicate with, other systems via the network 109 using a wire-line or wireless connection. In general, each client 106 (and each dispatcher 102) comprises an electronic computer device operable to receive, transmit, process, and store any appropriate data associated with the environment 100 of FIG. 1.

A request handler 131, e.g., can handle requests received from the dispatcher 102, e.g., forwarded from the client 106, for one or more data objects 113. The request handler 131 can also receive requests received from the dispatcher 102 to store updated values of data objects 113. In some implementations, the data objects 113 can be implemented using one or more relational data bases and/or other storage structures, and the stored data may be stored locally or distributed.

The illustrated client 106 further includes a processor 134, a memory 136, applications 138 (e.g., a browser), and an interface 140. The interface 140 is used by the client 106 for communicating with other systems in a distributed environment—including within the environment 100—connected to the network 109, e.g., the dispatcher 102, as well as other systems communicably coupled to the network 109 (not illustrated). Generally, the interface 140 comprises logic encoded in software and/or hardware in a suitable combination and operable to communicate with the network 109. More specifically, the interface 140 may comprise software supporting one or more communication protocols associated with communications such that the network 109 or interface's hardware is operable to communicate physical signals within and outside of the illustrated environment 100.

Applications 138 (e.g., browsers) can receive and provide information to the users 110 on each of the respective clients 106. As an example, in order to update a web page displayed in a browser on the client 106, the application 138 can provide a request for a data object 113 that is to be handled by a combination of the dispatcher 102 and the server 104.

As illustrated in FIG. 1, the client 106 includes the processor 134. Although illustrated as the single processor 134 in FIG. 1, two or more processors 134 may be used according to particular needs, desires, or particular implementations of the environment 100. Generally, the processor 134 executes instructions and manipulates data to perform the operations of the client 106. Specifically, the processor 134 executes the functionality required to send requests (e.g., through the dispatcher 102) to the server 104 and to receive and process responses from the server 104.

The illustrated client 106 also includes a memory 136. The memory 136 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 106.

The illustrated client 106 comprises a graphical user interface (GUI) 142, as shown with respect to and included by the client 106. The GUI 142 interfaces with at least a portion of the environment 100 for any suitable purpose, including user interface screens that display information associated with data objects 113.

Figure 2:
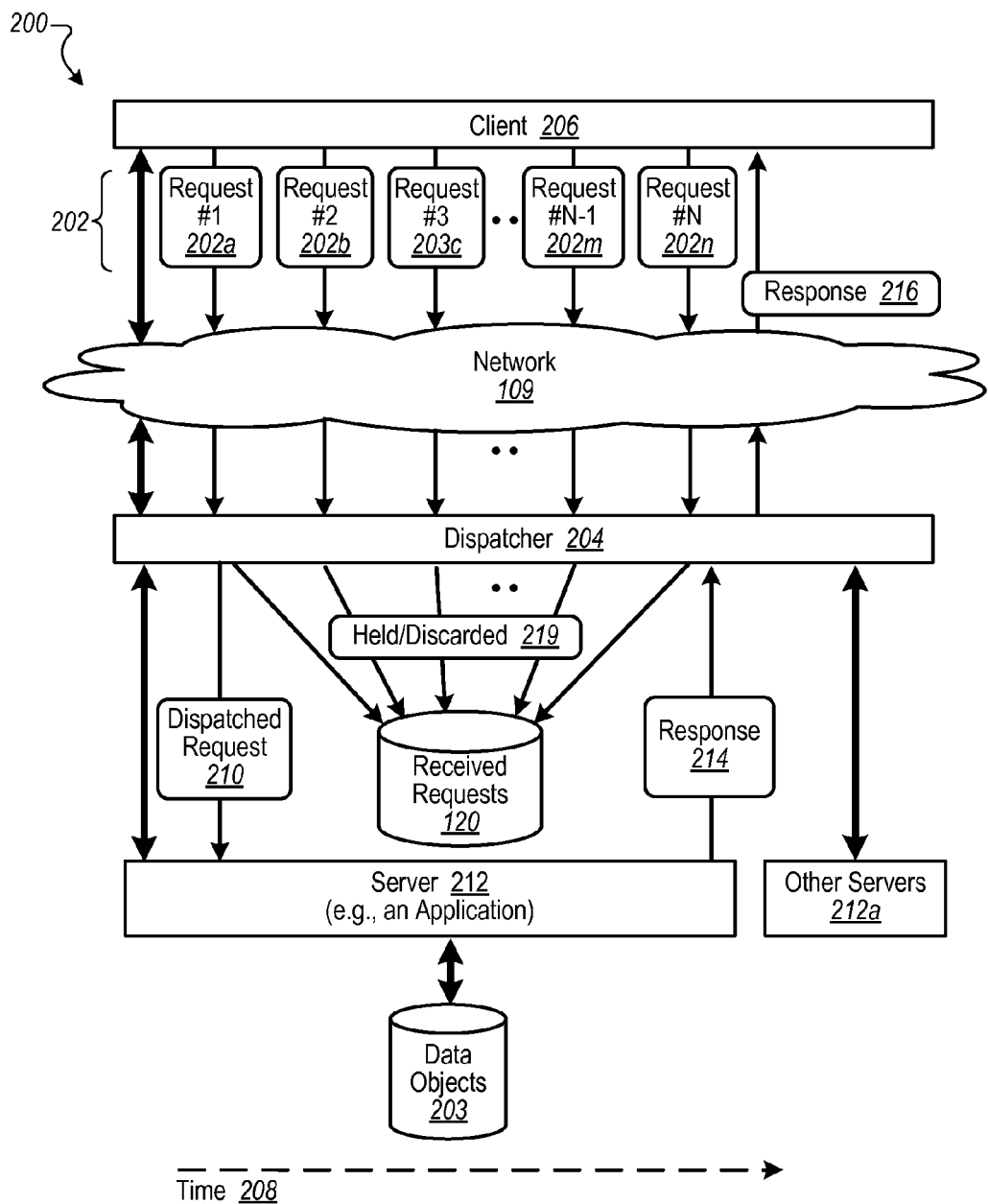
FIG. 2 is a block diagram showing an example of a system for handling co-pending, identical requests for a data object.

FIG. 2 is a block diagram showing an example of a system 200 for handling co-pending, identical requests 202 for a data object 203. The data object 203 can be, e.g., one or more data elements available from one or more data sources. For example, the data object 203 can include data used for updating information displayed on a web page. In some implementations, the system 200 can be implemented by the environment 100 described above. In some implementations, the data object can be a business object.

The system 200 includes a dispatcher 204 that can receive the identical requests 202 from a client 206 (e.g., the client 106.). The identical requests 202 can be received, for example, through the network 109 over a period of time 208, e.g., starting with an initial request (e.g., a Request #1 202*a*) for a first data object (e.g., a data request for updating product description information displayed on a shopping web page). Other subsequent identical requests 202 can include, e.g., Request #2 202*b*, Request #3 202*c*, Request #N−1 202*m*, and Request #N 202*n*. Each of the requests can be sent by the client 206, for example, when a user of the client 206 performs an interaction with the web page, e.g., resulting in a refresh command to update information that is displayed.

When Request #1 202*a* is received, e.g., an initial request of the identical requests 202, the dispatcher 204 can initiate processing, including dispatching the initial request to a server corresponding to the first data object. In some implementations, the dispatcher 204 can send a dispatched request 210, e.g., a forwarded or modified version of Request #1 202*a*, to a server 212 (e.g., the server 104). Upon receipt of the dispatched request 210, the server 212 can begin processing the request, such as to access one or more data bases or other data sources/structures to locate the requested data object or perform operations upon the data object based on and in response to request 210. Based on information in Request #1 202*a*, the dispatcher 204 can know that the dispatched request 210 is to be provided to the server 212, e.g., as opposed to one of other servers 212*a*, which may be associated with other data objects.

Prior to receiving a response 214 to the dispatched request 210 (e.g., corresponding to the requested first data object), the dispatcher 204 can receive Request #2 202*b*. Using information in the request, e.g., a user identifier, a device identifier, and/or other request source information, the dispatcher 204 can determine that Request #2 202*b* is identical to Request #1 202*a*, such as if the request comes from the same user, the same browser, or some other source indicating request redundancy. Upon determining that the requests are identical, the dispatcher 204 can hold Request #2 202*b* without dispatching an additional request to the server 212 that is identical to the dispatched request 210. Temporarily, at least, the dispatcher 204 can retain Request #2 202b, e.g., as a request to which to respond if the response 214 is received from the server 212. However, when a second identical request (e.g., Request #3 202c) is received, Request #2 202b can be discarded or otherwise disregarded. Discarding Request #2 202b (which is the first identical request) can occur, for example, after determining that the second identical request is identical to the initial request and the first identical request and that the second identical request is received prior to receiving the response 214 to the dispatched initial response. In this case, the dispatcher 204 can disregard the first identical request (e.g., Request #2 202b) and hold the second identical request (e.g., request #3 202c) without dispatching the second identical request (e.g., Request #3 202c) to the server (e.g. the server 212).

As additional identical requests 202 are received, each previously received identical request can be discarded, e.g., discarding Request #3 202c with an identical request is received after that one. Similar discarding of previously-received identical requests can continue, until Request #N 202n is received, at which time Request #N–1 202m can be discarded. At this time, Request #N 202n can serve as the most recent identical request.

The server 212, upon completing the request, can send the response 214 to the dispatcher 204. In response to receiving the response 214 (e.g., responsive data object in response to the initial request), the dispatcher 204 can provide the response 216 (e.g., responsive data object) in response to the most recent identical request. In this way, the response 214 is provided without initiating processing, by the server 212 of an additional request.

In some implementations, various optional extensions can be used for processing requests. For example, the dispatcher 204 can be configured to make a notification in response to an identical request received from the client 206, e.g., to avoid wasting a request that does not result in a returned response. For example, a notification can be returned to a client, asking a user to choose between waiting for an initial request (e.g., currently in process) or processing the new request with a chance of receiving more up-to-date data. In another example, an identical re-direction mechanism can redirect identical requests to another flow instead of deleting them. In some implementations, the dispatcher can identify a group of identical requests and prioritize requests that have a higher rank, e.g., in situations in which user requests or productive requests have a higher rank than maintenance requests.

Figure 3:
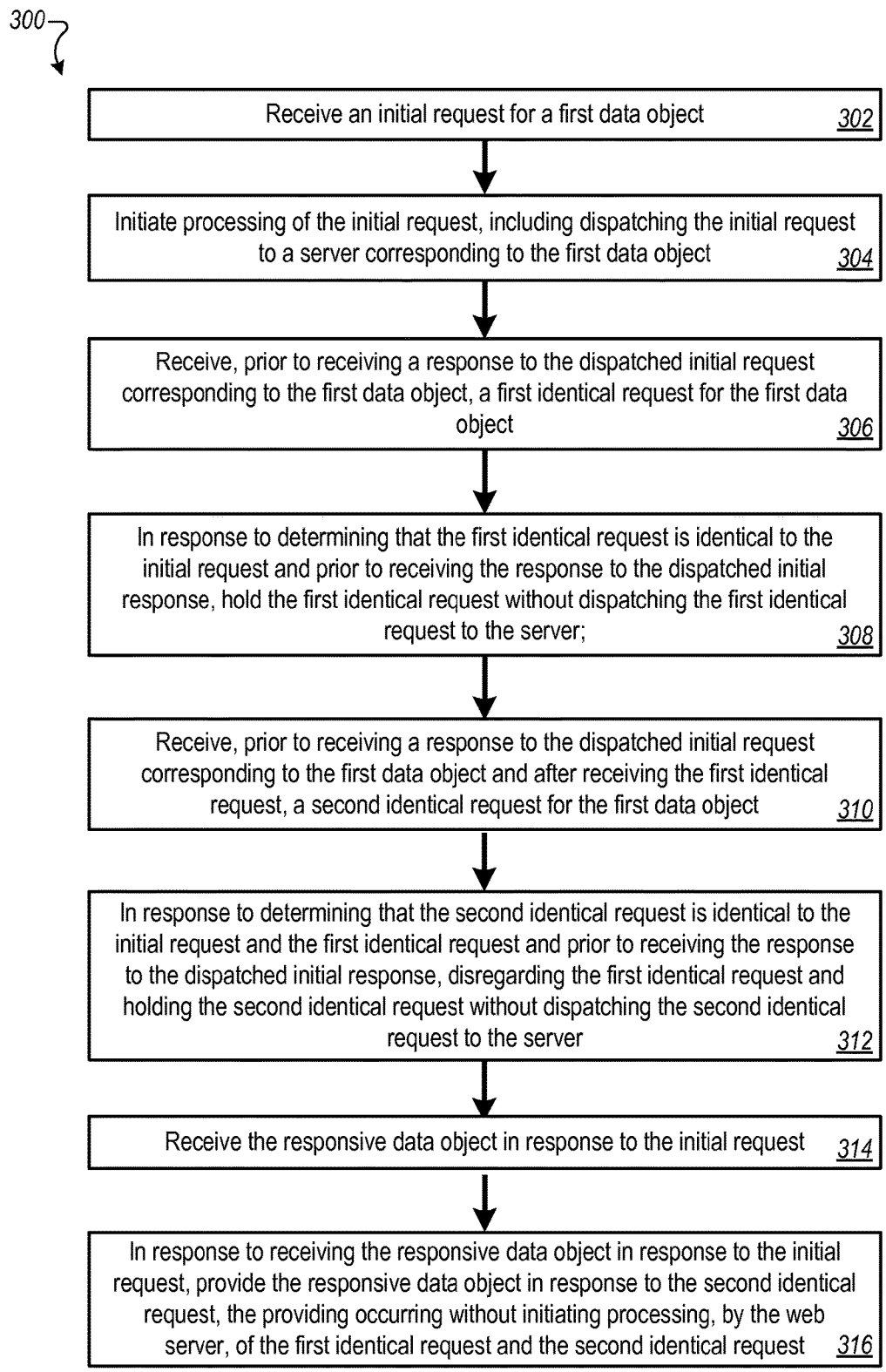
FIG. 3 is a flowchart of an example method for handling co-pending, identical requests for a data object.

FIG. 3 is a flowchart of an example method 300 for handling co-pending, identical requests for a data object. For clarity of presentation, the description that follows generally describes method 300 in the context of FIGS. 1-2. However, it will be understood that the method 300 may be performed, for example, by any other suitable system, environment, software, and hardware, or a combination of systems, environments, software, and hardware as appropriate. In some implementations, the dispatcher 102 and/or its components can be used to execute the method 300.

At 302, an initial request is received for a first data object. For example, the dispatcher 204 can receive an initial request (e.g., Request #1 202a) for a first data object (e.g., a data request for updating information displayed on a web page). The request can be sent by the client 206, for example, when a user of the client 206 performs an interaction with the web page (e.g., refresh) that causes a request for a data object 203 to be generated.

At 304, processing of the initial request is initiated, including dispatching the initial request to a server corresponding to the first data object. For example, the dispatcher 204, can identify Request #1 202a as a unique initial request, e.g., not matching any received requests 120 for the same data object 203 and the same user, device and/or other matching information. Because Request #1 202a is unique, the dispatcher 204 can send the dispatched request 210 to the server 212.

In some implementations, the server is, or includes, one or more of a web server and an application. For example, the server 212 can be an application, such as directed to a specific one of the data objects 203, or the server 212 can be a web server that processes requests for data to be provided on the web.

At 306, prior to receiving a response to the dispatched initial request corresponding to the first data object, a first identical request is received for the first data object. For example, as the result of a user refreshing the data on the screen in a browser on the client 206, an identical request (e.g., Request #2 202b) is received at the dispatcher 204. This can occur while the dispatched request 210 is still being processed by the server 212.

At 308, in response to determining that the first identical request is identical to the initial request and prior to receiving the response to the dispatched initial response, the first identical request is held without dispatching the first identical request to the server. Moreover, the first identical request is held without initiating processing, by the server, of the first identical request. For example, the dispatcher 204 can compare Request #2 202b to Request #1 202a and, at least initially, hold Request #2 202b. Both requests can be stored in the received requests 120.

In some implementations, the dispatcher 204 can determine that a threshold time has passed between requests that are identical. However, to prevent the use of stale data in responding to a request, the dispatcher 204 can forward the request to the server 212 for processing, thereby initiating processing of the request based on potentially updated data.

At 310, prior to receiving a response to the dispatched initial request corresponding to the first data object and after receiving the first identical request, a second identical request for the first data object is received. For example, another identical request (e.g., Request #3 202c) is received at the dispatcher 204 while the dispatched request 210 is still being processed by the server 212.

At 312, in response to determining that the second identical request is identical to the initial request and the first identical request, and prior to receiving the response to the dispatched initial response, the first identical request is disregarded and the second identical request is held without dispatching the second identical request to the server. For example, the dispatcher 204 can compare Request #3 202c to Request #2 202b, and based on determining that the requests are identical, disregard the (previously held) Request #2 202b and hold Request #3 202c. This pattern of processing can continue, for example, until Request #N–1 202m and ultimately Request #N 202n are received, after which Request #N–1 202m (and any previous identical requests) can be disregarded, and Request #N 202n can be held.

At 314, the responsive data object is received in response to the initial request. For example, the dispatcher 204 can receive the response 214 that has been generated by the server 212 in response to the dispatched request 210.

At 316, in response to receiving the responsive data object in response to the initial request, the responsive data object is provided in response to the second identical request, the providing occurring without initiating processing, by the server, of the first identical request and the second identical request. For example, the dispatcher 204 can provide the response 216 (e.g., generated from the response 214) in response to Request #N 202n.

In some implementations, the initial request is received from a first user and at least one of the first and second identical requests is received from a second different user, and providing the responsive data object in response to the second identical request further includes providing the responsive data object in response to a request from the other one of the first and second users. The dispatcher 204, for example, can be configured to provide the response 216 to one or the other of users for which identical responses are generated on two different clients 206.

In some implementations, the dispatcher 202 can process requests using a looping process. For example, the dispatcher 202 can receive an initial request for the data object (e.g., Request #1 202a) and dispatch (e.g., using the dispatched request 210) the initial request to the server 212 that corresponds to the data object. A loop can begin, continuing until the response 214 is received from the server 212, and including the following. A first new request (e.g., Request #2 202b) for the data object is received. A determination is made if the first new request is identical to the initial request. If the responses are identical, the first new request is held (e.g., without dispatching) and a wait ensues for the initial request to complete. A second new request (e.g., Request #3 202c) is received after the first new request. A determination is made that the second new request is identical to the first new request and the initial request. If the responses are identical, the second new request is held, the first new request is disregarded (e.g., deleted), and a wait ensues for the initial request to complete. Multiple identical requests may be received, such that N such identical requests are received. With each new identical request, the prior identical requests may be disregard and the wait continued until the processing of the request is completed. The loop ends when the response 214 is received from the server 212 in response to the initial request. In these instances, the responsive data object is associated with the most recent or latest identical request, and a response (e.g., the response 216) is made to the most recent or latest identical request with the responsive data object.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method, the method comprising:
receiving, at a dispatcher associated with a server, an initial request for performing processing associated with a first data object from a first client;
dispatching, by the dispatcher, the initial request to the server to initiate the processing associated with the first data object;
receiving, at the dispatcher and from the first client, and prior to the dispatcher receiving a response to the initial request from the server corresponding to the processing associated with the first data object, a second request for the processing associated with the first data object identical to the initial request from the first client;
in response to determining that the second request is identical to the initial request and prior to the dispatcher receiving the response from the server to the initial request from the first client, holding, by the dispatcher, the second request without dispatching the second request to the server and without transmitting a response to the initial request or the second request to the first client;
receiving, at the dispatcher and from the first client, prior to receiving the response to the initial request corresponding to the processing associated with the first data object, and after receiving the second request from the first client, a third request for the processing associated with the first data object, the third request identical to the initial request and the second request;
in response to determining that the third request is identical to the initial request and the second request, and prior to receiving the response to the initial request from the server, discarding the second request and holding the third request without dispatching the third request to the server and without transmitting a response to the initial request, the second request, or the third request to the first client;
receiving, from the server, at the dispatcher, and in response to the initial request, the response to the initial request corresponding to the processing associated with the first data object; and
in response to receiving the response from the server:
associating the received response with the currently held third request; and
transmitting the response to the first client in response to the third request, the transmitting occurring without dispatching, by the dispatcher, the second request and the third request to the server or responses to the initial or second request to the first client.

2. The method of claim 1, wherein the server is, or includes, one or more of a web server and an application.

3. The method of claim 1, wherein the initial request, the second request, and the third request are from the same user at the first client.

4. The method of claim 1, further comprising:
sending, by the dispatcher, a notification to the first client in response to determining that a new request is identical to a previously received request, wherein the notification includes an indication that a prior identical request was received and a request to a user associated with the first client to choose between waiting for a response to the initial request or processing the new request separately from the initial request.

5. The method of claim 1, wherein the first data object is a business object.

6. A system comprising:
at least one processor;
a memory storing:
a data store of received requests; and
an application operable when executed by the at least one processor to perform operations comprising:
receiving, from a first client, an initial request for performing processing associated with a first data object;
dispatching the received initial request to a server to initiate the processing associated with the first data object;
while waiting to receive a response to the dispatched initial request corresponding to the first data object from the server:
receiving, from the first client, by the application and prior to receiving the response to the initial request from the server corresponding to the processing associated with the first data object, at least one identical request for processing associated with the first data object identical to the initial request from the first client;
determining that the at least one identical request is identical to the initial request; and
holding the most recently received at least one identical request without dispatching any of the previously-received at least one identical requests to the server and discarding the previously-received at least one identical requests; and
receiving, from the server in response to the initial request, the response to the initial request corresponding to the processing associated with the first data object; and
in response to receiving the response to the initial request from the server:
associating the received response with the most recently received identical request; and
transmitting, to the first client, the response to the first client to the most recently received of the at least one identical requests to the first client, the transmitting occurring without dispatching any of the at least one identical requests to the server.

7. The system of claim 6, wherein the server is, or includes, one or more of a web server and an application.

8. The system of claim 6, wherein the initial request and the each of the at least one identical requests are from the same user of the first client.

9. The system of claim 6, the operations further comprising:
sending, by the application, a notification to the first client in response to determining that a new request is identical to a previously received request while waiting to receive a response to the initial request from the server.

10. The system of claim 6, wherein the first data object is a business object.

11. A non-transitory computer-readable media encoded with a computer program, the program comprising instructions that when executed by one or more computers cause the one or more computers to perform operations comprising:

receiving, at a dispatcher associated with a server and from a first client, an initial request for performing processing associated with a first data object;

dispatching, by the dispatcher, the initial request to the server to initiate the processing associated with the first data object;

receiving, at the dispatcher and from the first client, and prior to the dispatcher receiving a response to the initial request from the server corresponding to processing associated with the first data object, a second request for processing associated with the first data object identical to the initial request from the first client;

in response to determining that the second request is identical to the initial request and prior to the dispatcher receiving the response to the initial response from the first client, holding the second request without dispatching the second request to the server and without transmitting a response to the initial request or the second request to the first client;

receiving, at the dispatcher and from the first client, prior to receiving the response to the initial request corresponding to the processing associated with the first data object, and after receiving the second request from the first client, a third request for the processing associated with the first data object, the third request identical to the initial request and the second request;

in response to determining that the third request is identical to the initial request and the second request, and prior to receiving the response to the initial request from the server, discarding the second request and holding the third request without dispatching the third request to the server and without transmitting a response to the initial request, the second request, or the third request to the first client;

receiving, from the server, at the dispatcher, and in response to the initial request, the response to the initial request corresponding to the processing associated with the first data object; and in response to receiving the response from the server:
associating the received response with the currently held third request; and
transmitting the response to the first client in response to the third request, the transmitting occurring without dispatching, by the dispatcher, the second request and the third request to the server or responses to the initial or second request to the first client.

12. The non-transitory computer-readable media of claim 11, wherein the server is, or includes, one or more of a web server and an application.

13. The non-transitory computer-readable media of claim 11, wherein the initial request, the second request, and the third request are from the same user at the first client.

14. The non-transitory computer-readable media of claim 11, the operations further comprising:
sending, by the dispatcher, a notification to the first client in response to determining that a new request is identical to a previously received request.

\* \* \* \* \*